US009408162B2

United States Patent
Ho et al.

(10) Patent No.: US 9,408,162 B2
(45) Date of Patent: Aug. 2, 2016

(54) POWER HEADROOM FOR SIMULTANEOUS VOICE AND LONG TERM EVOLUTION

(75) Inventors: Sai Yiu Duncan Ho, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 182 days.

(21) Appl. No.: 13/247,973

(22) Filed: Sep. 28, 2011

(65) Prior Publication Data

US 2012/0082046 A1    Apr. 5, 2012

Related U.S. Application Data

(60) Provisional application No. 61/388,507, filed on Sep. 30, 2010.

(51) Int. Cl.
H04L 1/00 (2006.01)
H04W 52/34 (2009.01)
H04W 52/36 (2009.01)

(52) U.S. Cl.
CPC ............ *H04W 52/34* (2013.01); *H04W 52/367* (2013.01)

(58) Field of Classification Search
None
See application file for complete search history.

(56) References Cited

U.S. PATENT DOCUMENTS

| 8,145,127 | B2* | 3/2012 | Nory et al. ................... 455/13.4 |
| 2008/0004063 | A1* | 1/2008 | Haapoja ............. H04W 52/367 455/522 |
| 2009/0016245 | A1* | 1/2009 | Karls ................... H04W 88/06 370/310 |
| 2009/0103479 | A1* | 4/2009 | Goto ..................... H04L 1/0002 370/328 |
| 2009/0213805 | A1 | 8/2009 | Zhang et al. |
| 2009/0318180 | A1 | 12/2009 | Yi et al. |
| 2010/0113057 | A1* | 5/2010 | Englund ............... H04L 1/0026 455/452.1 |

(Continued)

FOREIGN PATENT DOCUMENTS

| CN | 101790859 A | 7/2010 |
| EP | 2141395 A1 | 1/2010 |
| WO | WO2009023726 A2 | 2/2009 |

(Continued)

OTHER PUBLICATIONS

PCT International Search Report and Written Opinion, Dec. 1, 2011, 12 Pages, European Patent Office, The Hauge, NL.

(Continued)

*Primary Examiner* — Candal Elpenord
*Assistant Examiner* — Hardikkumar Patel
(74) *Attorney, Agent, or Firm* — Arent Fox LLP

(57) ABSTRACT

A method, apparatus, and computer program product for wireless communication are provided in which a determination is made of a first power available for transmitting a first signal using a first radio access technology while simultaneously transmitting a second signal using a second radio access technology different from the first radio access technology. An uplink grant is received and a determination is made regarding a second power for transmitting the first signal on uplink using the first radio access technology based on the uplink grant. A determination is made regarding a difference between the first power and the second power. Information related to the difference is reported via the first radio access technology based on a trigger. The reporting information is triggered when the change of a power backoff from a last report exceeds a selected threshold.

28 Claims, 15 Drawing Sheets

(56) References Cited

U.S. PATENT DOCUMENTS

| | | | |
|---|---|---|---|
| 2010/0246463 A1* | 9/2010 | Papasakellariou .. | H04W 52/146 370/311 |
| 2011/0002246 A1* | 1/2011 | Li ..................... | H04L 1/0043 370/310 |
| 2011/0038271 A1* | 2/2011 | Shin et al. ................. | 370/252 |
| 2012/0243491 A1* | 9/2012 | Wu ..................... | H04W 28/06 370/329 |

FOREIGN PATENT DOCUMENTS

| WO | WO2010083324 A2 | 7/2010 |
|---|---|---|
| WO | WO2011002789 A1 | 1/2011 |

OTHER PUBLICATIONS

Huawei., "Power Headroom Report Enhancement for CA," 3GPP TSG-RAN WG1#62, R1-104493, Aug. 17, 2010, pp. 1-3.

Qualcomm Incorporated, "Details on PHR Report," 3GPP TSG-RAN WG1#62, R1-104791, Aug. 17, 2010, Agenda item: 6.2.3, pp. 1-3.

Translation of Japanese Office Action for Japanese Application No. 2013-531877 (103038JP) dated Apr. 1, 2014, 3 pages.

Chinese Office Action dated Jul. 29, 2015 and its English language Translation, for Chinese Patent Application Serial No. 201180057451.3, 16 pages.

Notice to File a Response for Korean Application No. 10-2013-7011254 dated Apr. 27, 2015, 5 pages (103038KR).

\* cited by examiner

POWER HEADROOM FOR SIMULTANEOUS VOICE AND LONG TERM EVOLUTION

CROSS-REFERENCE TO RELATED APPLICATION(S)

This application claims the benefit of U.S. Provisional Application Ser. No. 61/388,507, entitled "POWER HEADROOM FOR SIMULTANEOUS VOICE AND LONG TERM EVOLUTION" and filed on Sep. 30, 2010, the contents of which are hereby incorporated by reference herein in their entirety.

BACKGROUND

1. Field

The disclosure relates generally to communication systems, and more particularly, to a power headroom report for simultaneous transmissions on disparate radio access technologies.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, apparatus, and computer program product are provided in which a first power available for transmitting a first signal using a first radio access technology while simultaneously transmitting a second signal using a second radio access technology different from the first radio access technology is determined. An uplink grant is received, and a second power for transmitting the first signal on uplink using the first radio access technology based on the uplink grant is determined. A difference between the first power and the second power is determined, and upon a trigger, information related to the difference via the first radio access technology, is reported. The reported information may be triggered when the change of a power backoff from a last report exceeds a selected threshold.

DETAILED DESCRIPTION

Figure 1:
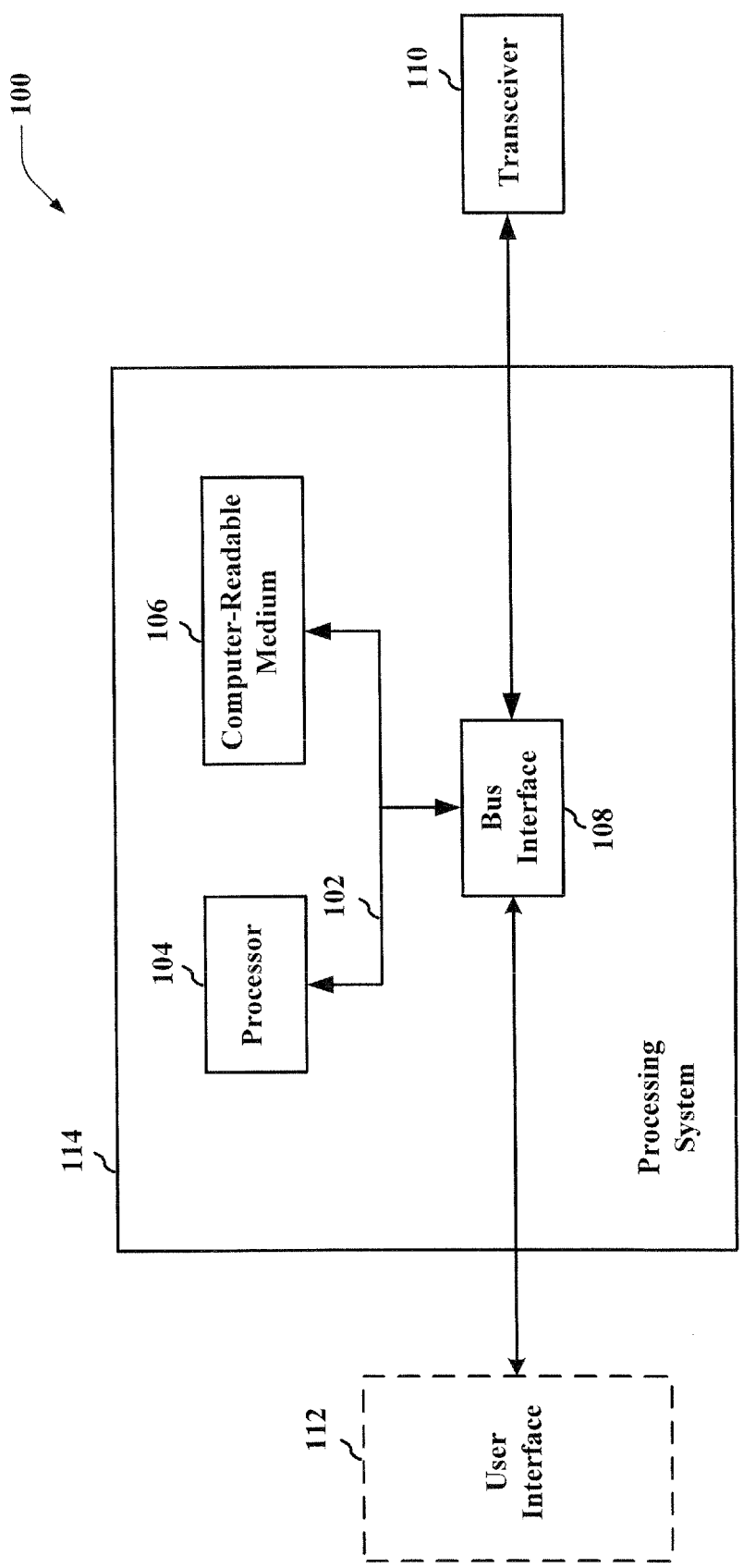
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
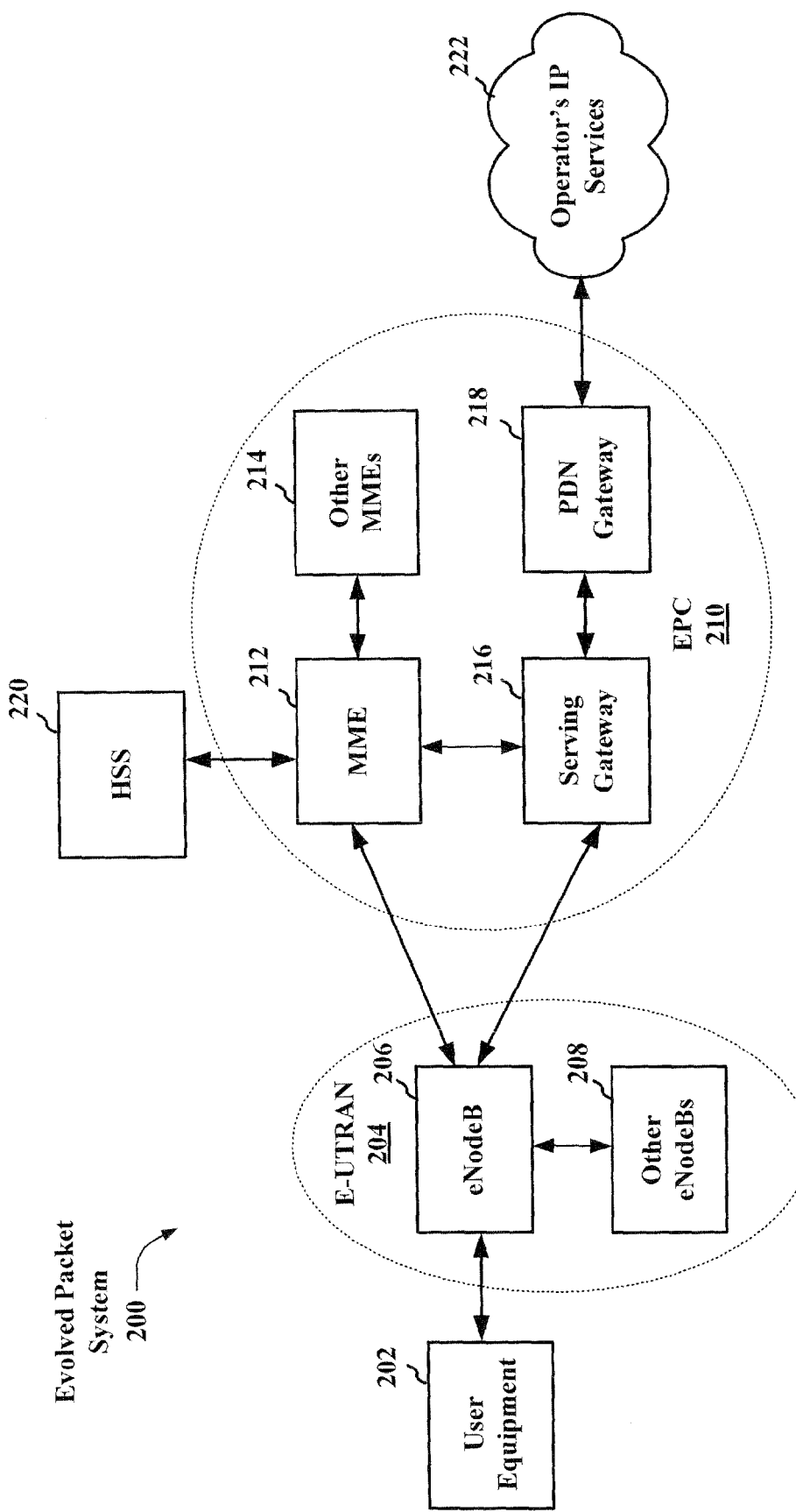
FIG. 2 is a diagram illustrating an example of a network architecture.

FIG. 2 is a diagram illustrating an LTE network architecture 200 employing various apparatuses 100. The LTE network architecture 200 may be referred to as an Evolved Packet System (EPS) 200. The EPS 200 consists of one or more user equipment (UE) 202, an Evolved UMTS Terrestrial Radio Access Network (E-UTRAN) 204, an Evolved Packet Core (EPC) 210, a Home Subscriber Server (HSS) 220, and an Operator's IP Services 222. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 206 and other eNBs 208. The eNB 206 provides user and control plane protocol terminations toward the UE 202. The eNB 206 may be connected to the other eNBs 208 via an X2 interface (i.e., backhaul). The eNB 206 may also be referred to by those skilled in the art as a base station, a base transceiver station, a radio base station, a radio transceiver, a transceiver function, a basic service set (BSS), an extended service set (ESS), or some other suitable terminology. The eNB 206 provides an access point to the EPC 210 for a UE 202. Examples of UEs 202 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 202 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 206 is connected by an S1 interface to the EPC 210. The EPC 210 includes a Mobility Management Entity (MME) 212, other MMEs 214, a Serving Gateway 216, and a Packet Data Network (PDN) Gateway 218. The MME 212 is the control node that processes the signaling between the UE 202 and the EPC 210. Generally, the MME 212 provides bearer and connection management. All user IP packets are transferred through the Serving Gateway 216, which itself is connected to the PDN Gateway 218. The PDN Gateway 218 provides UE IP address allocation as well as other functions. The PDN Gateway 218 is connected to the Operator's IP Services 212. The Operator's IP Services 222 include the Internet, the Intranet, an IP Multimedia Subsystem (IMS), and a PS Streaming Service (PSS).

Figure 3:
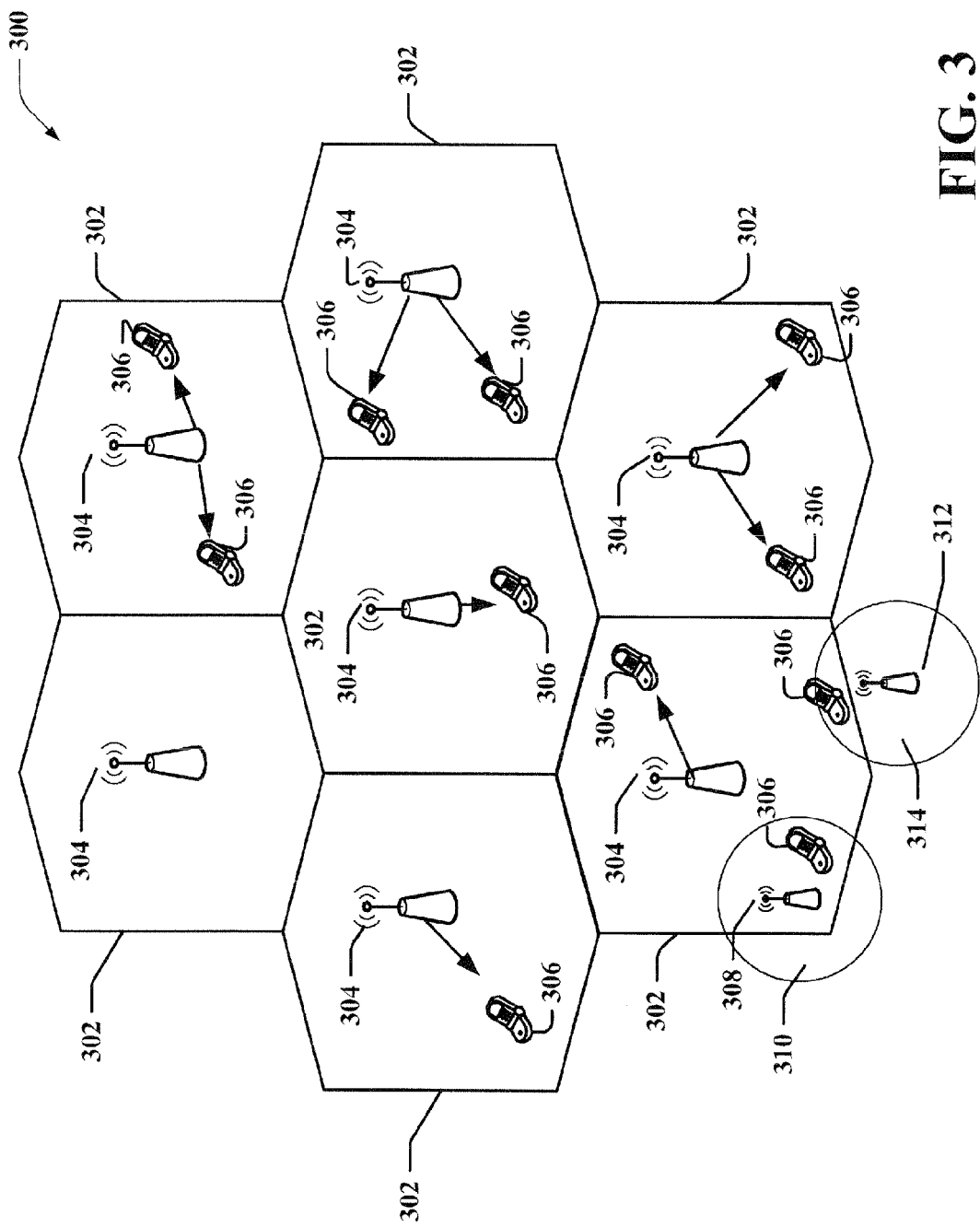
FIG. 3 is a diagram illustrating an example of an access network.

FIG. 3 is a diagram illustrating an example of an access network in an LTE network architecture. In this example, the access network 300 is divided into a number of cellular regions (cells) 302. One or more lower power class eNBs 308, 312 may have cellular regions 310, 314, respectively, that overlap with one or more of the cells 302. The lower power class eNBs 308, 312 may be femto cells (e.g., home eNBs (HeNBs)), pico cells, or micro cells. A higher power class or macro eNB 304 is assigned to a cell 302 and is configured to provide an access point to the EPC 210 for all the UEs 306 in the cell 302. There is no centralized controller in this example of an access network 300, but a centralized controller may be used in alternative configurations. The eNB 304 is responsible for all radio related functions including radio bearer control, admission control, mobility control, scheduling, security, and connectivity to the serving gateway 216.

The modulation and multiple access scheme employed by the access network 300 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNB 304 may have multiple antennas supporting MIMO technology. The use of MIMO technology enables the eNB 304 to exploit the spatial domain to support spatial multiplexing, beamforming, and transmit diversity.

Spatial multiplexing may be used to transmit different streams of data simultaneously on the same frequency. The data steams may be transmitted to a single UE 306 to increase the data rate or to multiple UEs 306 to increase the overall system capacity. This is achieved by spatially precoding each data stream and then transmitting each spatially precoded stream through a different transmit antenna on the downlink. The spatially precoded data streams arrive at the UE(s) 306 with different spatial signatures, which enables each of the UE(s) 306 to recover the one or more the data streams destined for that UE 306. On the uplink, each UE 306 transmits a spatially precoded data stream, which enables the eNB 304 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the downlink. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The uplink may use SC-FDMA in the form of a DFT-spread OFDM signal to compensate for high peak-to-average power ratio (PARR).

Figure 4:
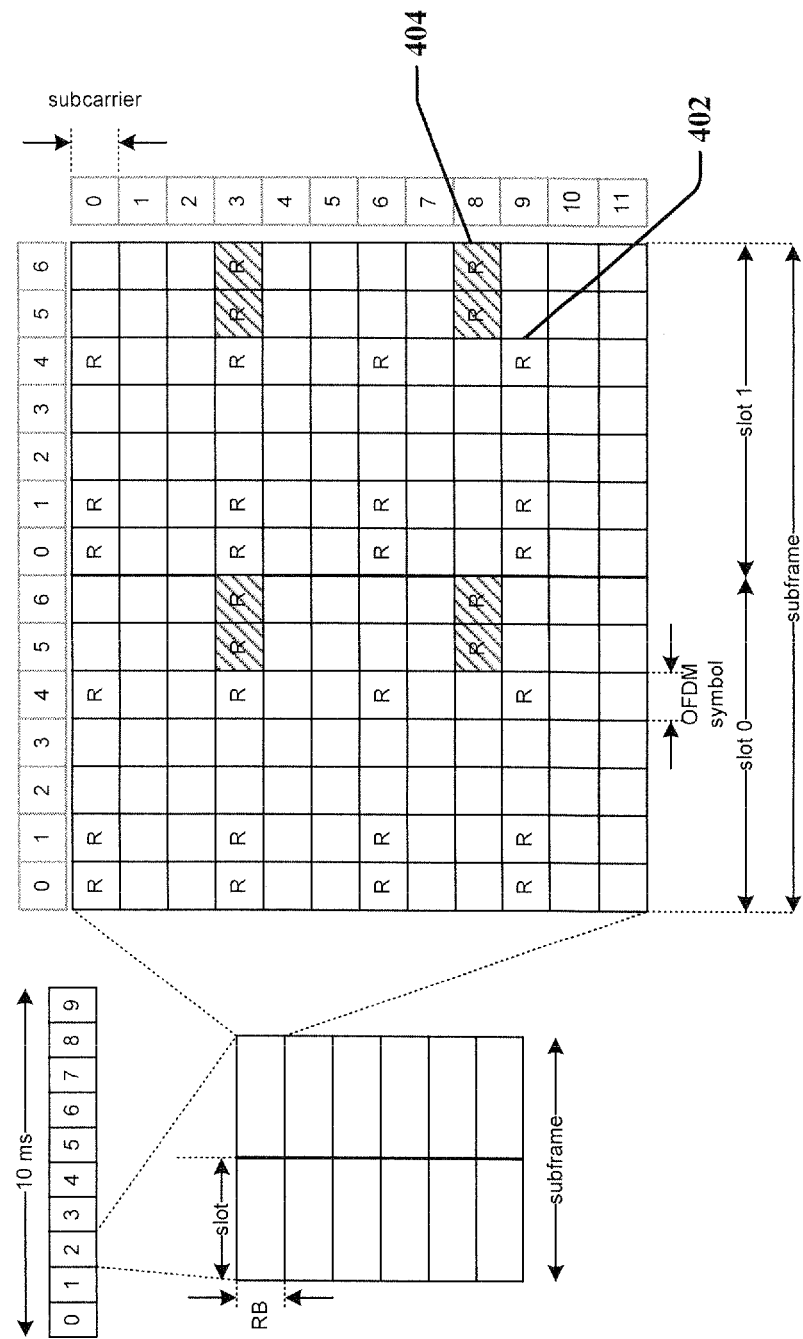
FIG. 4 is a diagram illustrating an example of a frame structure for use in an access network.

Various frame structures may be used to support the DL and UL transmissions. An example of a DL frame structure will now be presented with reference to FIG. 4. However, as those skilled in the art will readily appreciate, the frame structure for any particular application may be different depending on any number of factors. In this example, a frame (10 ms) is divided into 10 equally sized sub-frames. Each sub-frame includes two consecutive time slots.

A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. Some of the resource elements, as indicated as R 402, 404, include a DL reference signal (DL-RS). The DL-RS include Cell-specific RS (CRS) (also sometimes called common RS) 402 and UE-specific RS (UE-RS) 404. UE-RS 404 are transmitted only on the resource blocks upon which the corresponding physical downlink shared channel (PDSCH) is mapped. The number of bits carried by each resource element depends on the modulation scheme. Thus, the more resource blocks that a UE receives and the higher the modulation scheme, the higher the data rate for the UE.

Figure 5:
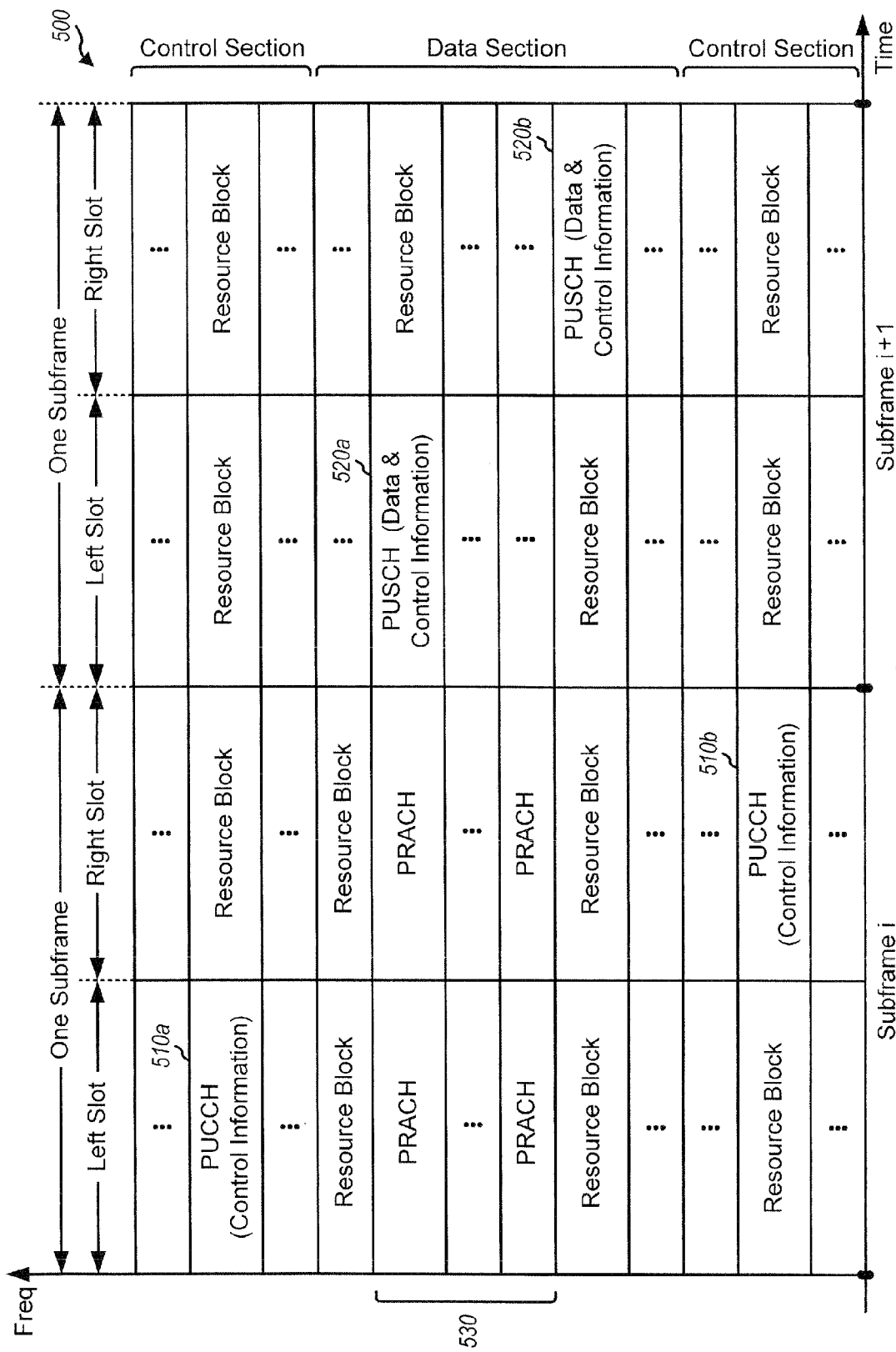
FIG. 5 shows an exemplary format for the UL in LTE.

An example of an UL frame structure will now be presented with reference to FIG. 5. FIG. 5 shows an exemplary format for the UL in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 5 results in the data section including contiguous subcarriers, which may allow a single UE to be assigned all of the contiguous subcarriers in the data section.

A UE may be assigned resource blocks 510a, 510b in the control section to transmit control information to an eNB. The UE may also be assigned resource blocks 520a, 520b in the data section to transmit data to the eNB. The UE may transmit control information in a physical uplink control channel (PUCCH) on the assigned resource blocks in the control section. The UE may transmit only data or both data and control information in a physical uplink shared channel (PUSCH) on the assigned resource blocks in the data section. An UL transmission may span both slots of a subframe and may hop across frequency as shown in FIG. 5.

As shown in FIG. 5, a set of resource blocks may be used to perform initial system access and achieve UL synchronization in a physical random access channel (PRACH). The PRACH carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for PRACH. The PRACH attempt is carried in a single subframe (1 ms) and a UE can make only a single PRACH attempt per frame (10 ms).

The PUCCH, PUSCH, and PRACH in LTE are described in 3GPP TS 36.211, entitled "Evolved Universal Terrestrial Radio Access (E-UTRA); Physical Channels and Modulation," which is publicly available.

Figure 6:
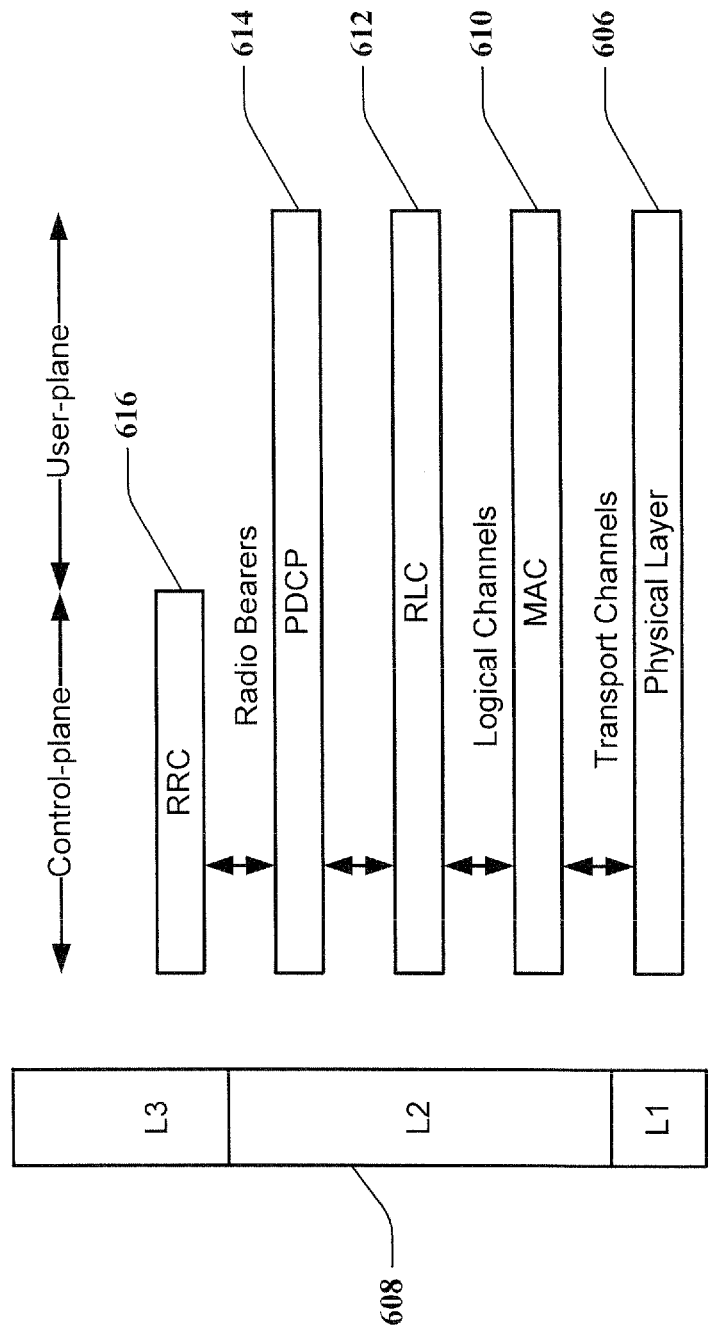
FIG. 6 is a diagram illustrating an example of a radio protocol architecture for the user and control plane.

The radio protocol architecture may take on various forms depending on the particular application. An example for an LTE system will now be presented with reference to FIG. 6. FIG. 6 is a conceptual diagram illustrating an example of the radio protocol architecture for the user and control planes.

Turning to FIG. 6, the radio protocol architecture for the UE and the eNB is shown with three layers: Layer 1, Layer 2, and Layer 3. Layer 1 is the lowest lower and implements various physical layer signal processing functions. Layer 1 will be referred to herein as the physical layer 606. Layer 2 (L2 layer) 608 is above the physical layer 606 and is responsible for the link between the UE and eNB over the physical layer 606.

In the user plane, the L2 layer 608 includes a media access control (MAC) sublayer 610, a radio link control (RLC) sublayer 612, and a packet data convergence protocol (PDCP) 614 sublayer, which are terminated at the eNB on the network side. Although not shown, the UE may have several upper layers above the L2 layer 608 including a network layer (e.g., IP layer) that is terminated at the PDN gateway 208 (see FIG. 2) on the network side, and an application layer that is terminated at the other end of the connection (e.g., far end UE, server, etc.).

The PDCP sublayer 614 provides multiplexing between different radio bearers and logical channels. The PDCP sublayer 614 also provides header compression for upper layer data packets to reduce radio transmission overhead, security by ciphering the data packets, and handover support for UEs between eNBs. The RLC sublayer 612 provides segmentation and reassembly of upper layer data packets, retransmission of lost data packets, and reordering of data packets to compensate for out-of-order reception due to hybrid automatic repeat request (HARQ). The MAC sublayer 610 provides multiplexing between logical and transport channels. The MAC sublayer 610 is also responsible for allocating the various radio resources (e.g., resource blocks) in one cell among the UEs. The MAC sublayer 610 is also responsible for HARQ operations.

In the control plane, the radio protocol architecture for the UE and eNB is substantially the same for the physical layer 606 and the L2 layer 608 with the exception that there is no header compression function for the control plane. The control plane also includes a radio resource control (RRC) sublayer 616 in Layer 3. The RRC sublayer 616 is responsible for obtaining radio resources (i.e., radio bearers) and for configuring the lower layers using RRC signaling between the eNB and the UE.

Figure 7:
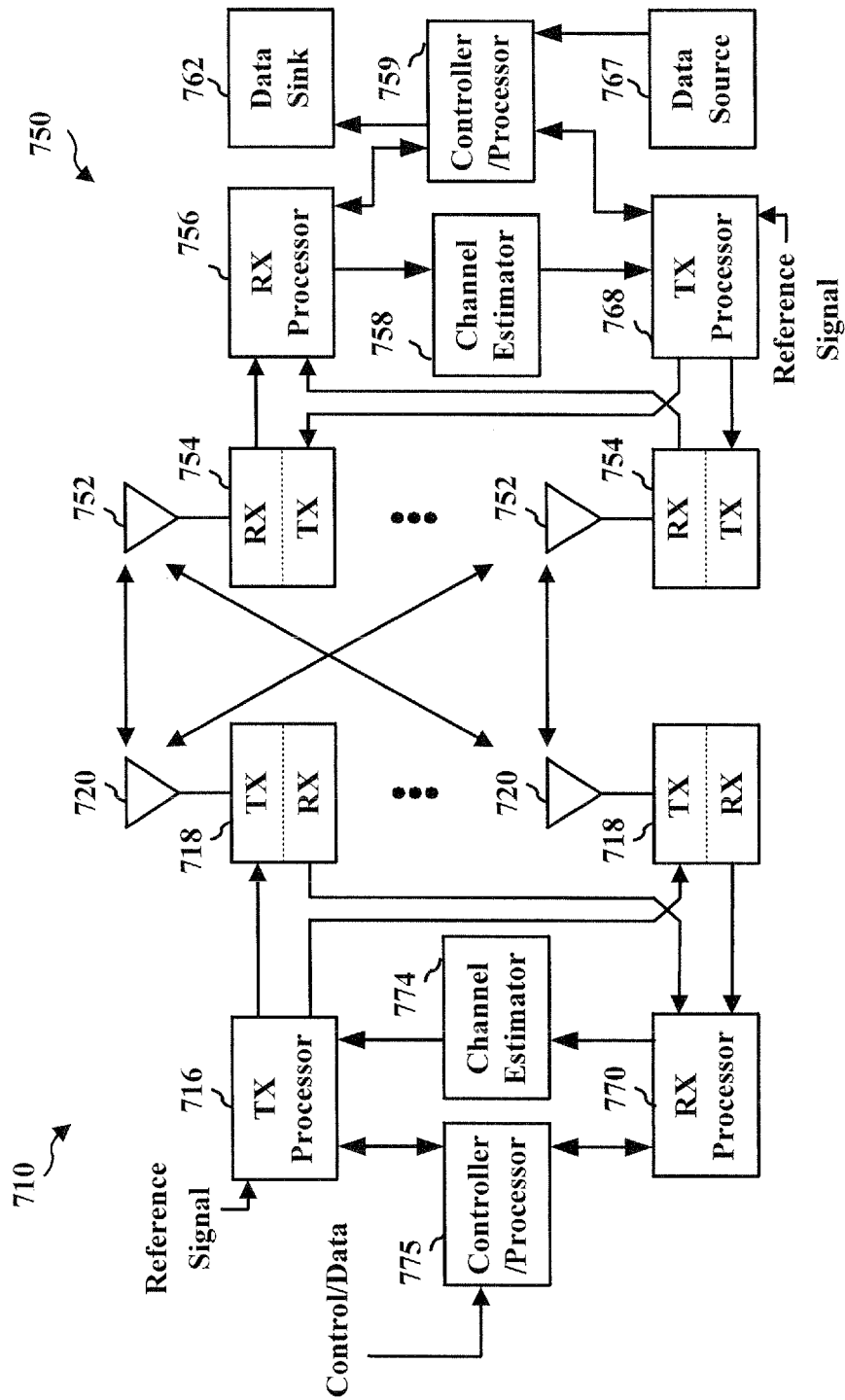
FIG. 7 is a diagram illustrating an example of an eNB and UE in an access network.

FIG. 7 is a block diagram of an eNB 710 in communication with a UE 750 in an access network. In the DL, upper layer packets from the core network are provided to a controller/processor 775. The controller/processor 775 implements the functionality of the L2 layer described earlier in connection with FIG. 6. In the DL, the controller/processor 775 provides header compression, ciphering, packet segmentation and reordering, multiplexing between logical and transport channels, and radio resource allocations to the UE 750 based on various priority metrics. The controller/processor 775 is also responsible for HARQ operations, retransmission of lost packets, and signaling to the UE 750.

The TX processor 716 implements various signal processing functions for the L1 layer (i.e., physical layer). The signal processing functions includes coding and interleaving to facilitate forward error correction (FEC) at the UE 750 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 774 may be used to determine the coding and modulation scheme, as well as for spatial processing. The channel estimate may be derived from a reference signal and/or channel condition feedback transmitted by the UE 750. Each spatial stream is then provided to a different antenna 720 via a separate transmitter 718TX. Each transmitter 718TX modulates an RF carrier with a respective spatial stream for transmission.

At the UE 750, each receiver 754RX receives a signal through its respective antenna 752. Each receiver 754RX recovers information modulated onto an RF carrier and provides the information to the receiver (RX) processor 756.

The RX processor 756 implements various signal processing functions of the L1 layer. The RX processor 756 performs spatial processing on the information to recover any spatial streams destined for the UE 750. If multiple spatial streams are destined for the UE 750, they may be combined by the RX processor 756 into a single OFDM symbol stream. The RX processor 756 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 710. These soft decisions may be based on channel estimates computed by the channel estimator 758. The soft decisions are then decoded and deinterleaved to recover the data and control signals that were originally transmitted by the eNB 710 on the physical channel. The data and control signals are then provided to the controller/processor 759.

The controller/processor 759 implements the L2 layer described earlier in connection with FIG. 5. In the UL, the control/processor 759 provides demultiplexing between transport and logical channels, packet reassembly, deciphering, header decompression, control signal processing to recover upper layer packets from the core network. The upper layer packets are then provided to a data sink 762, which represents all the protocol layers above the L2 layer. Various control signals may also be provided to the data sink 762 for L3 processing. The controller/processor 759 is also responsible for error detection using an acknowledgement (ACK) and/or negative acknowledgement (NACK) protocol to support HARQ operations.

In the UL, a data source 767 is used to provide upper layer packets to the controller/processor 759. The data source 767 represents all protocol layers above the L2 layer (L2). Similar to the functionality described in connection with the DL transmission by the eNB 710, the controller/processor 759 implements the L2 layer for the user plane and the control plane by providing header compression, ciphering, packet segmentation and reordering, and multiplexing between logical and transport channels based on radio resource allocations by the eNB 710. The controller/processor 759 is also responsible for HARQ operations, retransmission of lost packets, and signaling to the eNB 710.

Channel estimates derived by a channel estimator 758 from a reference signal or feedback transmitted by the eNB 710 may be used by the TX processor 768 to select the appropriate coding and modulation schemes, and to facilitate spatial processing. The spatial streams generated by the TX processor 768 are provided to different antenna 752 via separate transmitters 754TX. Each transmitter 754TX modulates an RF carrier with a respective spatial stream for transmission.

The UL transmission is processed at the eNB 710 in a manner similar to that described in connection with the receiver function at the UE 750. Each receiver 718RX receives a signal through its respective antenna 720. Each receiver 718RX recovers information modulated onto an RF carrier and provides the information to a RX processor 770. The RX processor 770 implements the L1 layer.

The controller/processor 759 implements the L2 layer described earlier in connection with FIG. 6. In the UL, the control/processor 759 provides demultiplexing between transport and logical channels, packet reassembly, deciphering, header decompression, control signal processing to recover upper layer packets from the UE 750. Upper layer packets from the controller/processor 775 may be provided to the core network. The controller/processor 759 is also responsible for error detection using an acknowledgement (ACK) and/or negative acknowledgement (NACK) protocol to support HARQ operations.

The processing system 114 described in relation to FIG. 1 includes the UE 750. In particular, the processing system 114 includes the TX processor 768, the RX processor 756, and the controller/processor 759.

Figure 8A:
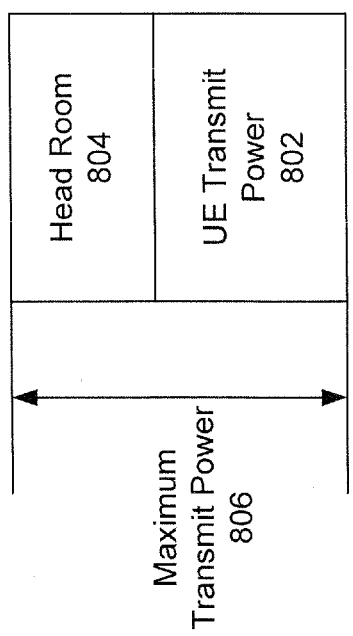
FIGS. 8A and 8B are diagrams illustrating aspects of Power Headroom Reports.
Figure 8B:
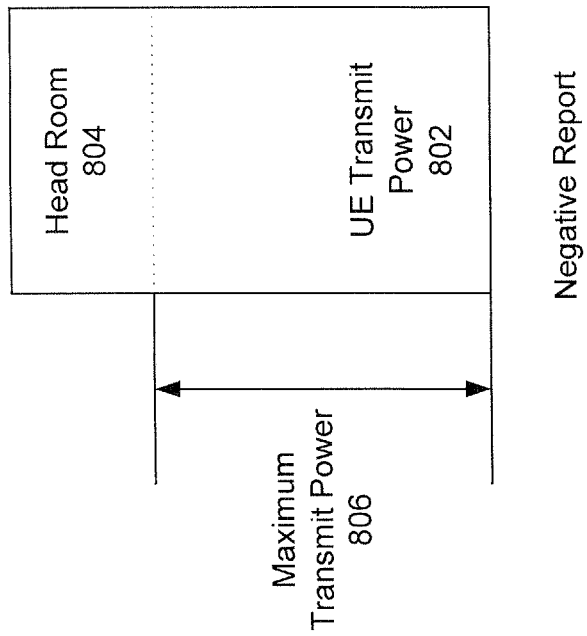

A UE Power Headroom Report (PHR) Control Element (CE) reports the amount of headroom available in the UE. This report is transmitted from the UE to an eNB in order to inform the eNB about transmission power abilities or limitations at the UE. The PHR is encoded as six bits with a reporting range from 40 dB to −23 dB. Positive values indicate the difference between the maximum UE transmit power and a current UE transmit power. FIG. 8A illustrates a positive headroom value 804, where the UE transmission power 802 is lower than the maximum transmission power 806. Negative values indicate the difference between the maximum UE transmit power and the calculated UE transmit power. FIG. 8B illustrates a negative headroom power. The calculated UE transmit power is the amount at which the UE were to transmit according to the current grant with allocated HARQ and Redundancy Version (RV) configuration.

Figure 9:
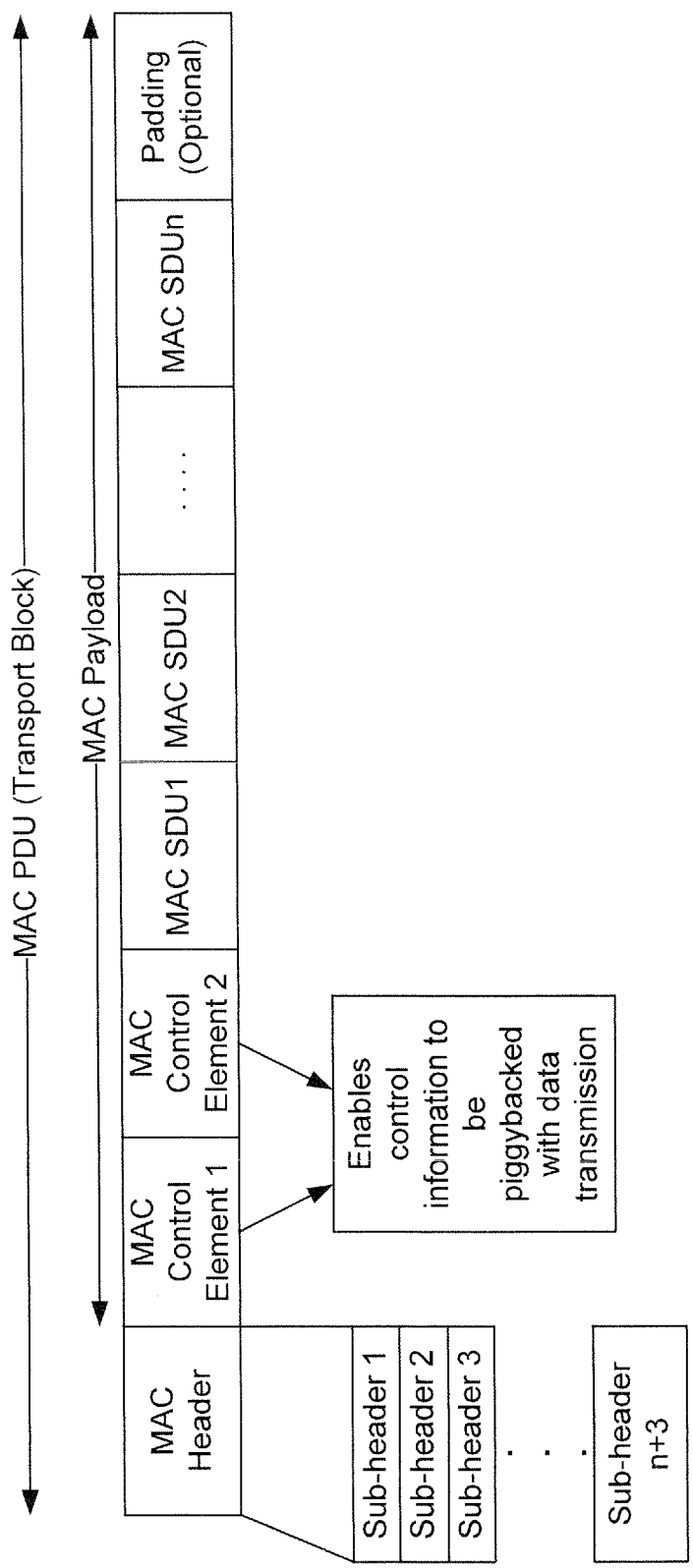
FIG. 9 is a diagram of a Medium Access Control Protocol Data Unit structure.

This PHR can be sent periodically or when a DL pathloss changes by a specific amount. The PHR is sent as a MAC CE. As illustrated in FIG. 6, MAC 610 is part of L2. MAC CE are control commands and reports that enable MAC operation. They are transmitted as part of the DL Shared Channel (DL-SCH) or Uplink Shared Channel (UL-SCH) and can be piggybacked on data payloads. The UE PHR is one of the CEs defined in the MAC specification. As illustrated in FIG. 9, a MAC Protocol Data Unit (PDU) may include a header, CEs, Service Data Units (SDUs), and padding. The header includes multiple subheaders, one for each constituent part of the MAC PDU. Each MAC PDU corresponds to one Transport Block, and the padding is optional. CEs are used to piggyback control information such as buffer status and power headroom reports.

Figure 10A:
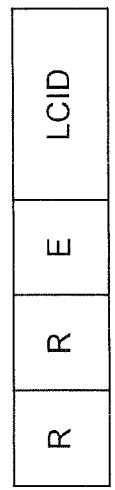
FIG. 10A is a diagram of a Medium Access Control element.
Figure 10B:
FIG. 10B is a diagram of a Power Headroom Report control element.

Each MAC CE included in the MAC PDU has an associated 1-byte sub-header in the MAC header of the format R/R/E/LCID, as illustrated in FIG. 10A. R indicates a reserved bit field. The E field indicates whether there are more fields present in the header. The Logical Channel ID (LCID) field indicates the type of MAC CE. FIG. 10B illustrates a MAC sub-header and CE for a PHR.

Figure 11:
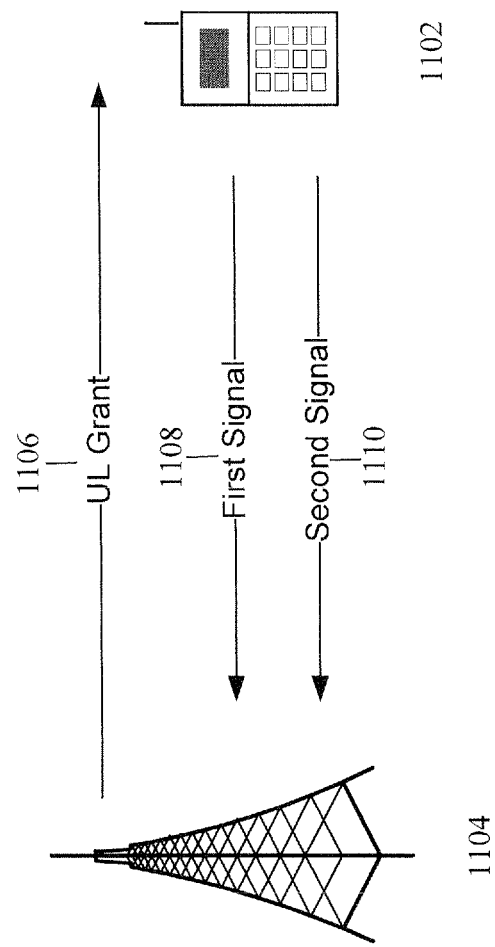
FIG. 11 is a diagram of a dual transmission mode system.

UEs are capable of transmission via disparate radio access technologies. FIG. 11 illustrates a UE 1102 in a dual transmission mode receiving a UL grant 1106 from an eNB 1104. The UE 1102 transmits a first signal 1108 to the eNB 1104 on the UL via a first radio access technology and transmits at least a second signal 1110 to the eNB 1104 on the UL via a second radio access technology.

Limitations may occur in the transmission power for one of the radio access technologies due to simultaneous transmission via disparate radio access technologies. For example, one of the first and second radio access technologies may have a higher priority leaving only a partial amount of headroom for the other signal that is transmitted via the lower priority radio access technology. At times the partial amount of headroom may drop below the level expected by the eNB 1104. A conventional PHR fails to provide adequate information to the eNB 1104 in this situation, leaving the eNB 1104 unaware of the UL transmission power limitations in the UE 1102 for the lower priority radio access technology.

As shown in FIG. 11, a UE 1102 may operate in a dual transmission or multi-transmission mode using disparate radio access technologies, such as in Simultaneous Voice and Long Term Evolution (SV-LTE) where voice may be transmitted via 1× and data may be transmitted via LTE. In SV-LTE mode, the UE can transmit simultaneously on 1× and LTE, thereby sharing the transmission power between the 1× and LTE signals because of Specific Absorption Rate (SAR) or other regulatory requirements. Voice may have a higher priority, thereby, at times, causing the 1× signal to be transmitted at an increased or maximum power. The remaining transmission power available for LTE transmission may be limited based on the 1× signal because both radio access technologies transmit from a shared antenna. For example, as shown in FIG. 11, the second signal (which may include voice) may be transmitted using radio access technology 1×, and the first signal may be transmitted using radio access technology LTE. In such a configuration, the first signal may be power limited based on the second signal. However, in a conventional system, a PHR will not be triggered due to this event, leaving the eNB 1104 unaware of the LTE UL transmission power limitations in the UE 1102.

As described supra, PHRs are triggered by a change in the DL pathloss. Changes may occur in the amount of headroom on the UL due to transmission by disparate radio access technologies without that information being provided to an eNB. The eNB will remain unaware of the UL transmission power limitation for the lower priority radio access technology in a UE, causing a power headroom mismatch between the eNB and the UE. The lower priority radio access technology may be, for example, LTE. The eNB may expect that the UE can transmit at a higher power when the UE can actually transmit only at a reduced power due to power sharing with a second radio access technology. This will cause the eNB to experience a higher HARQ failure rate, depending on the amount of the discrepancy.

In order to overcome these problems, aspects include conveying more accurate power headroom information to the eNB due to simultaneous transmission via disparate radio access technologies. This additional PHR, referred to interchangeably herein as a multi-Radio Access Technology (RAT) PHR, may be reported in addition to the conventional PHR. The multi-RAT PHR includes information regarding the amount of headroom available for at least one of the radio access technologies based on the current uplink grant and signal transmission via disparate radio access technologies.

Figure 12:
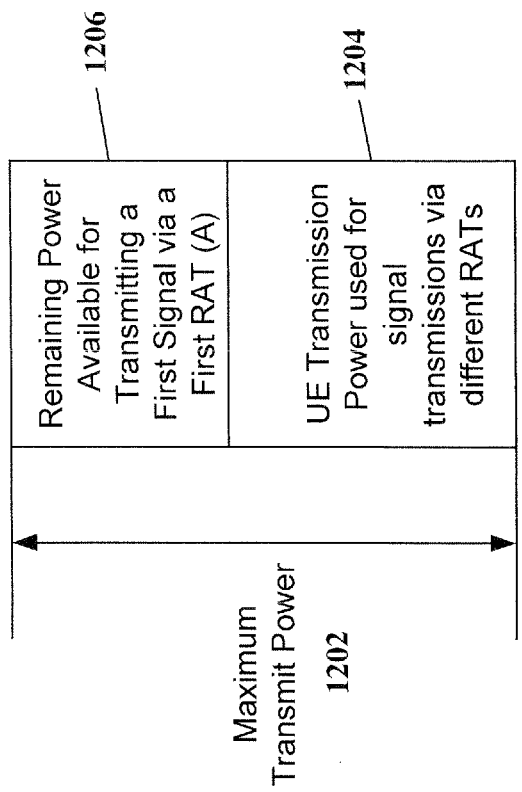
FIG. 12 is a diagram illustrating aspects of a UE UL transmission power.

In an exemplary configuration, the UE determines the multi-RAT headroom, according to Equation 1 infra. The UE first determines A (1206), a maximum power that the UE could use to transmit a first signal on a first radio access technology with the current UL grant. FIG. 12 illustrates the determination of the maximum power A 1206 that the UE has available for transmitting the first signal. The power A 1206 is determined by subtracting a power 1204 used by concurrently transmitting a second signal using a second radio access technology from a maximum transmit power 1202. The portion 1204 of the maximum transmission power 1202 may be utilized by the second signal being transmitted via the second radio access technology. The portion 1204 may also be utilized by additional concurrently transmitted signals through other radio access technologies. This leaves only a portion 1206 of the maximum transmission power 1202 for transmitting a first signal via the first radio access technology. This portion 1206 is A in Equation 1.

Next, the UE determines B, a required transmit power based on PUSCH power control equations for the current UL grant. The calculated B indicates to the UE the required amount of transmission power for transmitting the first signal on UL using the first radio access technology based on the UL grant. B is the UE transmission power 802 from the calculated PHR in FIG. 8. The UE then calculates the multi-RAT headroom by comparing A and B, such as by determining a difference between A and B. The UE then reports information regarding the calculated headroom to the eNB.

$$\text{multi-RAT Headroom} = A - B \quad \text{(Eq. 1)}$$

A=Maximum power the UE could use for transmitting on a first radio access technology with the current UL grant
B=Required transmit power based on PUSCH power control equations.

Figure 13:
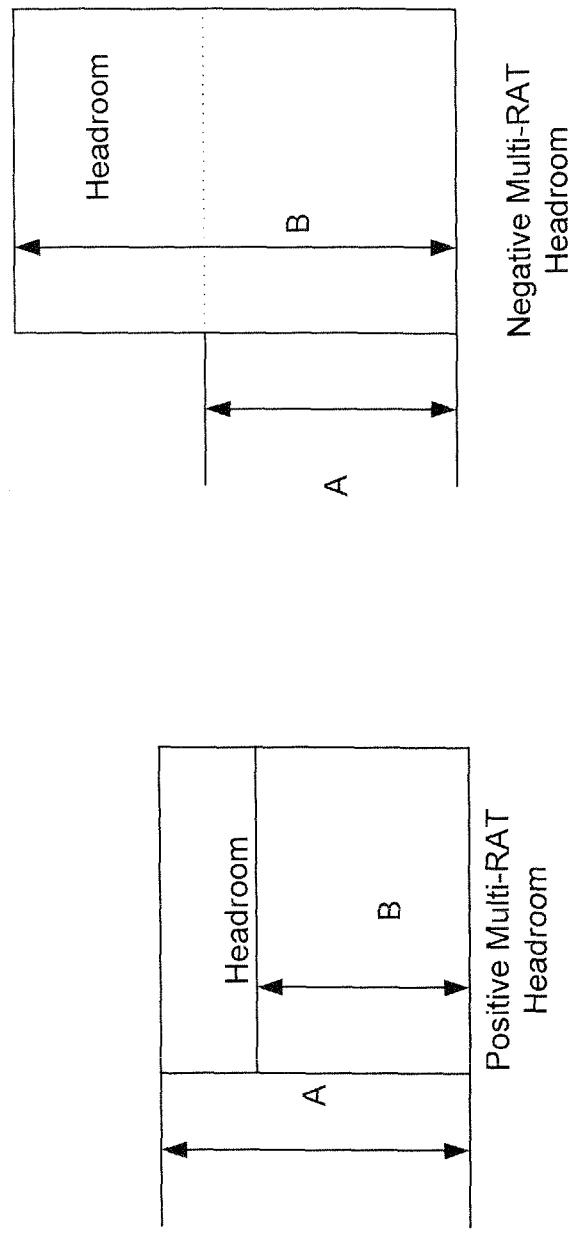
FIG. 13A is a diagram illustrating aspects of a positive multi-radio access technology Power Headroom Report.
FIG. 13B is a diagram illustrating aspects of a negative multi-radio access technology Power Headroom Report.

FIG. 13A illustrates a positive multi-RAT Headroom, having A greater than B. FIG. 13B illustrates a negative multi-RAT Headroom, wherein B exceeds A. FIG. 13B illustrates a headroom mismatch between the eNB and the UE for transmitting a first signal via a first radio access technology. The increase or decrease in the calculated multi-RAT headroom may be caused by a change in at least one of the UL grant and the transmission power used by other radio technologies at the UE. A power headroom mismatch becomes more problematic when A is less than B.

The multi-RAT PHR can be triggered in a number of ways. For example, the multi-RAT PHR may be triggered by the expiration of a periodic timer. Therefore, whenever a predetermined amount of time elapses, a multi-RAT PHR may be sent to the eNB. Alternatively or additionally, the report may be triggered by a determination that the calculated multi-RAT headroom has changed by a threshold amount. Therefore, any time that the multi-RAT headroom calculated by the UE increases or decreases by an amount equal to or above a predetermined amount, X dB, a multi-RAT PHR will be triggered and transmitted to the eNB. Different eNBs may have different levels of tolerance for a power headroom mismatch between themselves and a UE. Therefore, the threshold amount X may be configurable by an eNB, so that it can determine the rate at which it will receive information on changes in the multi-RAT PHR based on its particular sensitivity to such changes.

In accordance with an aspect of the disclosure, power headroom reports (PHR) may be triggered by a change in transmission power headroom. When User Equipment (UE) operates in the Simultaneous Voice and Long Term Evolution (SV-LTE) mode (e.g., voice on using radio access technology (1x) and data on LTE simultaneously), the UE may transmit on 1x and LTE simultaneously, and thus, the UE transmission power may be shared by 1x and LTE due to SAR (Specific Absorption Rate) or other regulatory requirements. As a result, if voice has higher priority, 1x may need to be transmitted at max power (or close to max power), and the power remaining for LTE UL transmission may be reduced. Since a PHR may not be triggered for this event, the evolved Node B (eNB) may not be aware of the LTE UL transmission power reduction in the UE. As such, an independent report mechanism may be utilized to convey more accurate LTE power headroom information to the eNB when operating in the SV-LTE mode. In one example, this report mechanism may be as independent as possible of the existing PHR to achieve improved transmission efficiency.

Accordingly, a new PHR may be triggered in LTE when an SV-LTE UE is simultaneously active on 1x. Triggering the new PHR may occur when uplink (UL) power backoff due to 1x activity change in the UE exceeds some threshold (e.g., as may be configured by the eNB). The new PHR may only apply to UEs with simultaneous transmission on multiple radio access technologies (e.g., SV-LTE), as indicated in the current UE capability. This new PHR may be in addition to an existing PHR.

The new PHR may be defined as follows:

$$\text{Power Headroom} = A - B, \text{ where}$$

A=Max power the UE could be transmitting on LTE with current UL grant,
B=Required transmit power based on physical uplink shared channel (PUSCH) power control equations.

In one embodiment, the trigger may include a report trigger, where the power backoff used by a UE has changed more than X dB (e.g., 5 dB, a range value between 0 to 10 dB, and/or any other desirable value or range configured by the eNB) since the last power headroom report. A periodic report may have little or no impact on UEs that are not supporting simultaneous transmission on multiple radio access technologies. The value X and the periodic report may be configurable by a radio resource control (RRC).

In another embodiment, the trigger may include at least two triggers: when power backoff change exceeds some threshold and a periodic timer expires.

In another embodiment, one of the reserved bits in the PHR media access control (MAC) channel element (CE) may be used to indicate a new type of PHR. The triggers of this new type of PHR may be the same as those described above.

In one embodiment, referring to FIG. 11, a sequence of events for LTE may occur as follows. The eNB 1104 is configured to send a UL grant to the UE 1102. The UE 1102 is configured to compute the transmit power needed to transmit on the UL grant. The UE 1102 is configured to compute the delta between the transmit power needed to transmit on the UL grant and the maximum power that the UE 1102 can transmit, and that delta is referred to as the power headroom. Based on the power headroom, the eNB 1104 is configured to decide whether to increase, decrease, or keep the same UL grant for the NEXT UL grant sent to the UE 1102. As such, the eNB 1104 may adjust the UL grant to the UE 1102 based on the PHR reported by the UE 1102.

An aspect of the disclosure takes into account the transmit power used for 1x (where power headroom may essentially be reduced). The new power headroom computed by the UE 1102 reflects a more accurate power headroom that the UE 1102 has available for LTE.

As the demand for mobile broadband access continues to increase, there exists a need for improvements in LTE technology. For instance, power headroom reports (PHR) may only be triggered by change in DL pathloss and not by change in the transmission power headroom. When voice has higher priority, there may be situations when 1x needs to be transmitted at maximum power (or close to maximum power), and the power remaining for LTE UL transmission may be limited. The consequence is power headroom mismatch between the eNB and the UE (e.g., the eNB expected the UE to transmit at some power when the UE actually may only transmit at a lower power due to power sharing with 1x). In these situations, the eNB may experience a higher HARQ (hybrid automatic repeat request) failure rate depending on this discrepancy.

As such, reporting information as a new PHR may be triggered when the change of a power backoff from a last report exceeds a selected threshold. In other words, when the uplink (UL) power backoff due to 1x activity change in the UE exceeds some threshold, the new PHR may be triggered, for example, in LTE when an SV-LTE UE is simultaneously active on 1x.

It is noted that Equation 1 considers the effects of any other radio access technology interface that limits the transmission power for a first signal via a first radio access technology. This may include a second signal via a second radio access technology, or additional radio access technologies that affect the UL power headroom.

As noted supra, the multi-RAT PHR may be sent in addition to a conventional PHR. The multi-RAT PHR may be structured in a number of ways. For example, the multi-RAT PHR may be structured as a new PHR report that is sent in addition to the conventional PHR illustrated in FIGS. 8-10. The multi-RAT PHR can be structured as a new MAC CE, separate from the PHR. The multi-RAT PHR could be sent only by UEs that are capable of simultaneous transmission on multiple radio access technologies, such as, for example, via SV-LTE. Alternately, the report may have the same structure as the PHR in FIGS. 8-10 by using one of the reserved bits in the PHR MAC CE to indicate the type of PHR to the eNB. FIG. 10 illustrates that the subheader corresponding to the PHR includes a number of reserved bits. These reserved bits could be used to indicate to the eNB that the report is a multi-RAT PHR. The LCID may use the same indication as for the PHR, and the headroom report sent in the control element section of the MAC PDU may use the same structure as the conventional PHR. Thus, by using a reserved bit indicating the type of PHR report, the eNB can discern between a PHR and a multi-RAT PHR even though the LCID and control element of the multi-RAT PHR report is the similar to the PHR.

The multi-RAT PHR provides additional headroom information to the eNB in order to prevent a power headroom mismatch between the eNB and the UE that may occur when the UE transmits using disparate radio access technologies.

Figure 14:
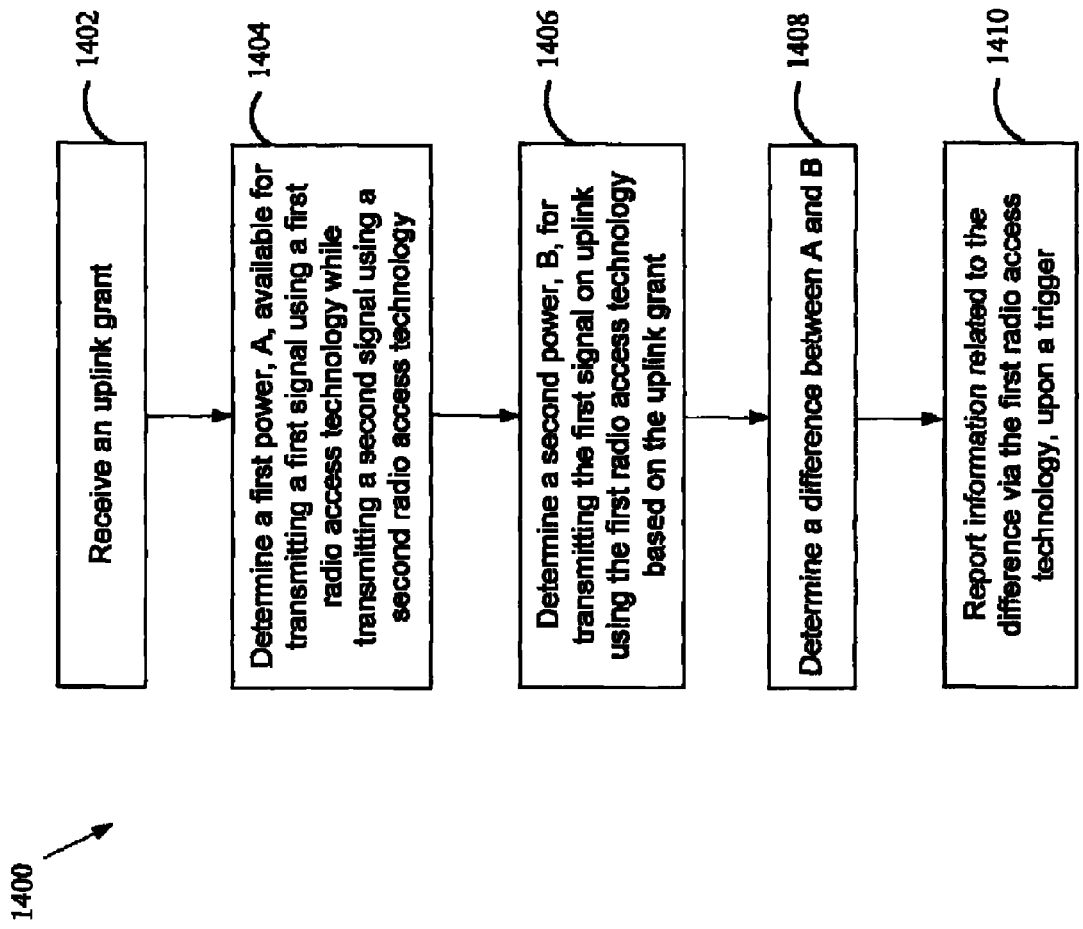
FIG. 14 is a flow chart of a method of wireless communication.

FIG. 14 is a flow chart 1400 of a method of wireless communication. The method receives an uplink (UL) grant from an eNB (1402). The method determines a first power, A, available for transmitting a first signal using a first radio access technology while simultaneously transmitting a second signal using a second radio access technology different from the first radio access technology (1404). As discussed herein, the first radio access technology may be LTE, and the second radio access technology may be a second radio access technology such as, in various examples, 1x, Evolution-Data Optimized (EVDO), Bluetooth, etc. The user equipment (UE) may operate in, for example, SV-LTE mode.

The method determines a second power, B, for transmitting the first signal on uplink using the first radio access technology based on the uplink grant (1406). The method then determines the difference between the first and the second power, by calculating multi-RAT Headroom=A−B, (1408). Based upon a trigger, the method reports information related to the difference via the first radio access technology (1410). As discussed herein, this trigger may be the expiration of a timer or a determination that the multi-RAT Headroom has changed by a threshold amount from the last reported multi-RAT Headroom. In one example, the method may report the information as a PHR MAC Control Element having a modified reserved bit indicating the type of Power Headroom Report. In another example, the method may report the information as a new MAC Control Element different from the PHR.

An aspect of the disclosure takes into account the transmit power used for 1x (where power headroom may essentially be reduced). The new power headroom computed by the UE reflects a more accurate power headroom that the UE has available for LTE. As such, reporting information as a new PHR may be triggered when the change of a power backoff from a last report exceeds a selected threshold. In other words, when the uplink (UL) power backoff due to 1x activity change in the UE exceeds some threshold, the new PHR may be triggered, for example, in LTE when an SV-LTE UE is simultaneously active on 1x.

Figure 15:
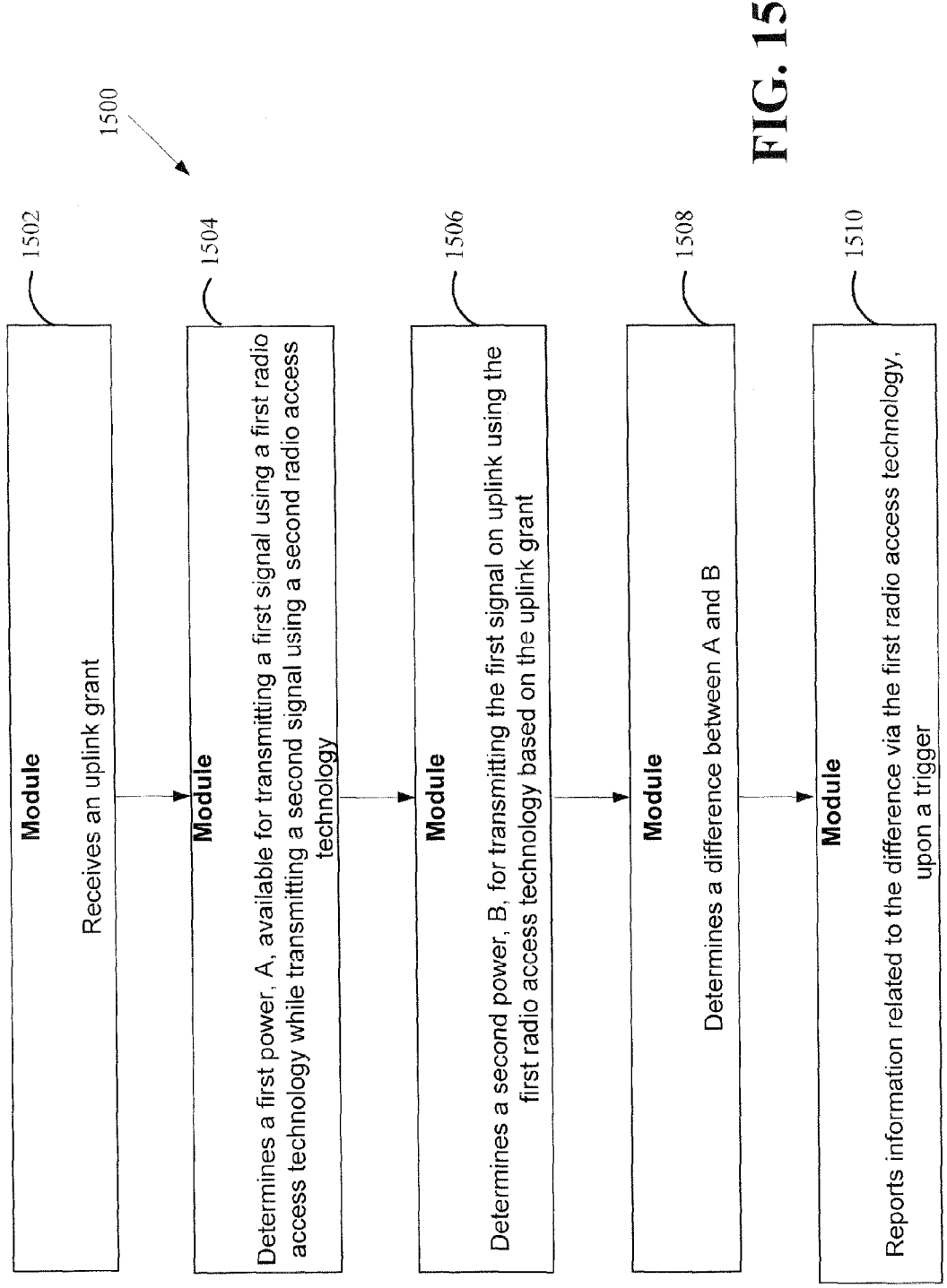
FIG. 15 is a conceptual block diagram illustrating the functionality of an exemplary apparatus.

FIG. 15 is a conceptual block diagram 1500 illustrating the functionality of an exemplary apparatus 100. The apparatus 100 includes a module 1502 that receives an uplink grant, a module 1504 that determines a first power, A, available for transmitting a first signal using a first radio access technology while transmitting a second signal using a second radio access technology different from the first radio access technology, a module 1506 that determines a second power, B, for transmitting the first signal on uplink using the first radio access technology based on the uplink grant, a module 1508 that determines a difference between the first power and the second power, and a module 1510 that reports information related to the difference via the first radio access technology, upon a trigger. The power headroom computed by the UE reflects a more accurate power headroom that the UE has available for LTE. As such, reporting information as a new PHR may be triggered when the change of a power backoff from a last report exceeds a selected threshold. As such, when the uplink (UL) power backoff due to 1x activity change in the UE exceeds some threshold, the new PHR may be triggered, for example, in LTE when an SV-LTE UE is simultaneously active on 1x.

Referring to FIG. 1 and FIG. 7, in one configuration, the apparatus 100 for wireless communication includes means for determining a first power available for transmitting a first signal using a first radio access technology while simultaneously transmitting a second signal using a second radio access technology different from the first radio access technology, means for receiving an uplink grant, means for determining a second power for transmitting the first signal on uplink using the first radio access technology based on the uplink grant, means for determining a difference between the first power and the second power, and means for reporting information related to the difference via the first radio access technology, upon a trigger. The aforementioned means is the processing system 114 configured to perform the functions recited by the aforementioned means. As described supra, the processing system 114 includes the TX Processor 768, the RX Processor 756, and the controller/processor 759. As such, in one configuration, the aforementioned means may be the TX Processor 768, the RX Processor 756, and the controller/processor 759 configured to perform the functions recited by the aforementioned means.

The first radio access technology may be LTE, and the second radio access technology may include one of 1x, Evolution-Data Optimized, and Bluetooth. The trigger may be an expiration of a timer or a determination that the difference has changed by a threshold amount from the last reported difference. The report may be transmitted as a PHR MAC CE having a modified reserved bit indicating the type of PHR. The report may be transmitted as a new MAC CE different from a PHR.

In one embodiment, a new PHR may only apply to UE's that are capable of simultaneous transmission on multiple radio access technologies (e.g., SV-LTE), as indicated in the current UE capability. In another embodiment, two triggers of the new PHR are described herein: when power backoff change exceeds some threshold and a periodic timer expires. In still another embodiment, one of the reserved bits in the PHR MAC CE may be used to indicate a new type of PHR. The triggers of this new type of PHR may be the same as those described herein.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication at a User Equipment (UE), comprising:
   receiving an uplink grant;
   determining a first power from a shared available transmission power at the UE for simultaneously transmitting a first data signal using a first radio access technology and transmitting a second voice signal using a second radio access technology different from the first radio access technology;
   determining a second power from the shared available transmission power for transmitting the first data signal on an uplink using the first radio access technology based on the uplink grant;
   determining a difference between the first power and the second power; and
   reporting, upon a trigger, information related to the difference via the first radio access technology,
   wherein the reporting information is triggered when a change of a power backoff from a last report exceeds a threshold.

2. The method according to claim 1, wherein the first radio access technology is Long Term Evolution (LTE).

3. The method according to claim 2, wherein the second radio access technology includes one of 1×, Evolution-Data Optimized, and Bluetooth.

4. The method according to claim 1, further comprising:
   operating in a mode for simultaneously transmitting the first data signal using the first radio access technology and the second voice signal using the second radio access technology.

5. The method according to claim 1, wherein the reporting information is triggered when the change of the power backoff from the last report exceeds the threshold and upon an expiration of a periodic timer.

6. The method according to claim 1, wherein the reporting is performed as a Power Headroom Report Medium Access Control (MAC) Control Element having a reserved bit indicative of a type of Power Headroom Report.

7. The method according to claim 1, wherein the reporting is performed as a new Medium Access Control (MAC) Control Element different from a Power Headroom Report of the UE.

8. An apparatus for wireless communication, comprising:
   means for receiving an uplink grant;
   means for determining a first power from a shared available transmission power at a User Equipment (UE) for simultaneously transmitting a first data signal using a first radio access technology and transmitting a second voice signal using a second radio access technology different from the first radio access technology;
   means for determining a second power from the shared available transmission power for transmitting the first data signal on an uplink using the first radio access technology based on the uplink grant;
   means for determining a difference between the first power and the second power; and
   means for reporting, upon a trigger, information related to the difference via the first radio access technology,
   wherein the reporting information is triggered when a change of a power backoff from a last report exceeds a threshold.

9. The apparatus according to claim 8, wherein the first radio access technology is Long Term Evolution (LTE).

10. The apparatus according to claim 9, wherein the second radio access technology includes one of 1×, Evolution-Data Optimized, and Bluetooth.

11. The apparatus according to claim 8, further comprising:
   means for operating in a mode for simultaneously transmitting the first data signal using the first radio access technology and the second voice signal using the second radio access technology.

12. The apparatus according to claim 8, wherein the means for reporting the information triggers a report upon an expiration of a timer.

13. The apparatus according to claim 8, wherein the means for reporting the information performs a report via a Power Headroom Report Medium Access Control (MAC) Control Element having a reserved bit indicative of a type of Power Headroom Report.

14. The apparatus according to claim 8, wherein the means for reporting the information performs a report via a new Medium Access Control (MAC) Control Element separate from a Power Headroom Report of the UE.

15. A computer program product, comprising:
   a non-transitory computer-readable medium in a User Equipment (UE) comprising code for:
      receiving an uplink grant;
      determining a first power from a shared available transmission power at the UE for simultaneously transmitting a first data signal using a first radio access technology and transmitting a second voice signal using a second radio access technology different from the first radio access technology;

determining a second power from the shared available transmission power for transmitting the first data signal on uplink using the first radio access technology based on the uplink grant;

determining a difference between the first power and the second power; and reporting, upon a trigger, information related to the difference via the first radio access technology, wherein the reporting information is triggered when a change of a power backoff from a last report exceeds a threshold.

16. The computer program product according to claim 15, wherein the first radio access technology is Long Term Evolution (LTE).

17. The computer program product according to claim 16, wherein the second radio access technology includes one of 1x, Evolution-Data Optimized, and Bluetooth.

18. The computer program product according to claim 15, wherein the non-transitory computer-readable medium further comprises code for:

operating in a mode for simultaneously transmitting the first data signal using the first radio access technology and the second voice signal using the second radio access technology.

19. The computer program product according to claim 15, wherein the code for reporting the information triggers a report upon an expiration of a timer.

20. The computer program product according to claim 15, wherein the code for reporting the information performs a report via a Power Headroom Report Medium Access Control (MAC) Control Element having a reserved bit indicative of a type of Power Headroom Report.

21. The computer program product according to claim 15, wherein the code for reporting the information performs a report via a new Medium Access Control (MAC) Control Element separate from a Power Headroom Report of the UE.

22. An apparatus for wireless communication, comprising:
a memory; and
at least one processor coupled to the memory and configured to:
receive an uplink grant via a transceiver;
determine a first power from a shared available transmission power at a User Equipment (UE) for simul taneously transmitting a first data signal using a first radio access technology and transmitting a second voice signal using a second radio access technology different from the first radio access technology;

determine a second power from the shared available transmission power for transmitting the first data signal on an uplink using the first radio access technology based on the uplink grant;

determine a difference between the first power and the second power; and report, upon a trigger, information related to the difference via the transceiver using the first radio access technology, wherein the report information is triggered when a change of a power backoff from a last report exceeds a threshold.

23. The apparatus according to claim 22, wherein the first radio access technology is Long Term Evolution (LTE).

24. The apparatus according to claim 23, wherein the second radio access technology includes one of 1x, Evolution-Data Optimized, and Bluetooth.

25. The apparatus according to claim 22, wherein the at least one processor is further configured to:

operate in a mode for simultaneously transmitting the first data signal using the first radio access technology and the second voice signal using the second radio access technology.

26. The apparatus according to claim 22, wherein to report the information, the at least one processor is configured to trigger a report upon an expiration of a timer.

27. The apparatus according to claim 22, wherein to report the information, the at least one processor is configured to perform the report via a Power Headroom Report Medium Access Control (MAC) Control Element having a reserved bit indicative of a type of Power Headroom Report.

28. The apparatus according to claim 22, wherein to report the information, the at least one processor is configured to perform the report via a new Medium Access Control (MAC) Control Element separate from a Power Headroom Report of the UE.

* * * * *